(12) United States Patent
Tsirkin et al.

(10) Patent No.: US 8,230,008 B2
(45) Date of Patent: Jul. 24, 2012

(54) PERSISTING GRAPHICS STRUCTURES ACROSS CLIENT CHANGE IN GRAPHICS REMOTING ENVIRONMENT

(75) Inventors: Michael S. Tsirkin, Yokneam (IL); Izik Eidus, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 170 days.

(21) Appl. No.: 12/714,380

(22) Filed: Feb. 26, 2010

(65) Prior Publication Data

US 2011/0213828 A1    Sep. 1, 2011

(51) Int. Cl.
*G06F 15/16* (2006.01)
(52) U.S. Cl. .............. 709/203; 709/217; 709/224
(58) Field of Classification Search .......... 709/200–203, 709/217–227, 228
See application file for complete search history.

(56) References Cited

U.S. PATENT DOCUMENTS

| | | | |
|---|---|---|---|
| 7,359,920 B1* | 4/2008 | Rybicki et al. | 707/617 |
| 2003/0023735 A1* | 1/2003 | Funahashi et al. | 709/229 |
| 2006/0271500 A1* | 11/2006 | Obrea et al. | 705/76 |
| 2007/0183493 A1* | 8/2007 | Kimpe | 375/240.1 |
| 2008/0222273 A1* | 9/2008 | Lakshmanan et al. | 709/219 |
| 2009/0036190 A1* | 2/2009 | Brosnan et al. | 463/16 |
| 2010/0211983 A1* | 8/2010 | Chou | 725/93 |
| 2010/0211987 A1* | 8/2010 | Chou | 725/119 |
| 2010/0312548 A1* | 12/2010 | Herley | 704/9 |

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Moustafa M Meky
(74) *Attorney, Agent, or Firm* — Lowenstein Sandler PC

(57) ABSTRACT

A server receives one or more hashes from a client, where each of the hashes represents a graphics structure maintained by the client. A first hash is generated from a graphics structure according to a hash algorithm, where the graphics structure is generated from an application hosted within the server, where the graphics structure represents a display output of the application. It is determined whether there is an existing hash from the one or more hashes received from the client that matches the first hash. The first hash is transmitted to the client without sending the graphics structure if there is an existing hash matching the first hash. The first hash is used by the client to identify a graphics structure maintained by the client for rendering a display of the client.

21 Claims, 5 Drawing Sheets

US 8,230,008 B2

PERSISTING GRAPHICS STRUCTURES ACROSS CLIENT CHANGE IN GRAPHICS REMOTING ENVIRONMENT

TECHNICAL FIELD

The present invention relates generally to graphics remoting. More particularly, this invention relates to persisting graphics structures across client changes in graphics remoting applications.

BACKGROUND

Graphics remoting systems allow computing device network clients to connect to a remote server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

Graphical applications, such as video games, can request displaying complex graphics structures, such as textures and surfaces, on screen. These graphics structures are then displayed by a graphical user interface (GUI) system (also referred to as a window system such as X window System™). Typically, a client may access multiple remote systems (as servers) for graphics remoting purposes. When the client disconnects from one remote system and connects with another remote system, all graphics structures have to be resent from the new remote system to the client. As a result, the traffic incurred over the network is significant.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, graphics structures are maintained by a client system and/or a host system. In addition, for each graphics structure, a hash is generated from the graphics structure and maintained by both the client system and/or the host system. In one embodiment, when a client accesses a first remote system (e.g., server), the client receives one or more graphics structures from the first remote server for rendering a display of the client. In addition, for each graphics structure, a hash is generated and maintained by the client, as well as the graphics structures. When the client disconnects from the first remote server and connects with a second remote server, according to one embodiment, the client may send all the hashes maintained locally to the second remote server. The second remote server in turn determines whether the client already had the required graphics structure by matching the hashes of the client with the one corresponding to a graphics structure currently rendered at the second remote server. If there is a hash matched, the matched hash, instead of the corresponding graphics structure, is sent from the second remote server to the client. The client can then identify the graphics structure stored locally based on the hash received from the second remote server and render the graphics structure accordingly. Thus, instead of resending the entire graphics structure, if a host system determines that the client already had the same graphics structure based on the comparison of the hashes, the hash is sent to the client. The entire new graphics structure is sent to the client only if it is determined that the client does not have the new graphics structure (e.g., there is no existing hash matching the new one). As a result, the traffic across a network between the host system and the client can be reduced significantly.

Figure 1:
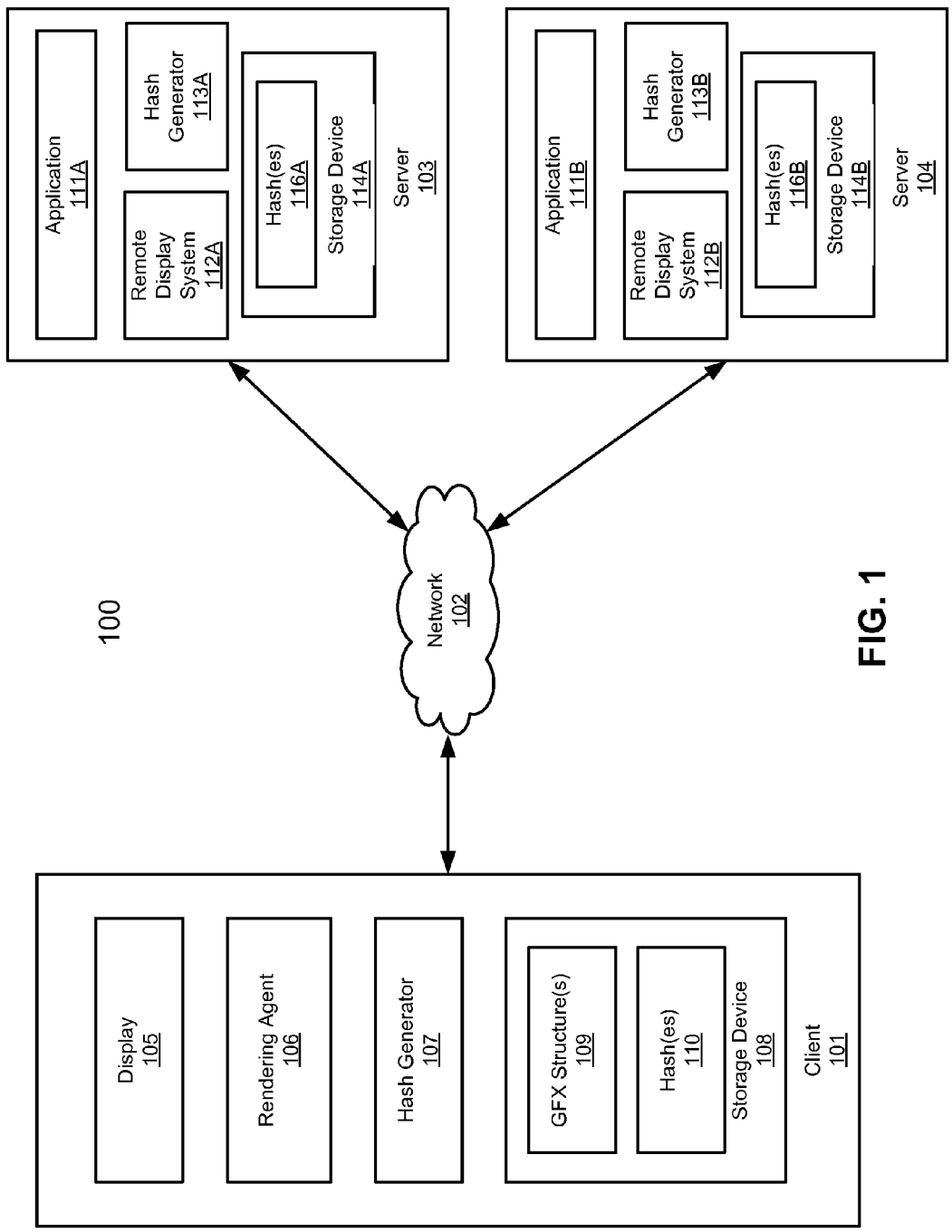
FIG. 1 is a block diagram illustrating a network configuration according to one embodiment.

FIG. 1 is a block diagram illustrating a network configuration according to one embodiment. Referring to FIG. 1, system 100 includes, but is not limited to, client 101 communicatively coupled to one or more remote servers 103-104 over a network 102. Network 102 may be a local area network (LAN) or a wide area network (WAN) and may be a combination of one or more networks. Client 101 can be any computer system in communication with servers 103-104 for remote execution of applications at servers 103-104. For example, system 100 may be implemented as part of a graphics remoting system. Generally, a client such as client 101 can be a computer system in communication with server 103/104 for remote execution of applications at server 103/104. Thus, input data (e.g., mouse and keyboard input) representing application commands is received at a client (e.g., client 101) and transferred over network 102 to server 103/104. Server 103/104 can be any computing system.

In response to client side data, an application (e.g., application 111) can generate output display commands (e.g., graphics commands referred to herein as graphics data or structures), which may include one or more paint and/or draw operations, for example, in the form of executable instructions. The output display commands can then be transmitted (e.g., as graphics update commands) with or without compression by a remote display system (e.g., remote display system 112A) to the remote client (e.g. client 101) and a remote display application (e.g., rendering agent 106) of the remote client can collect the graphics commands and generate corresponding drawing commands for rendering data at the display (e.g., display 105) of the client.

The data may be exchanged between client 101 and server 103/104 using a variety of communication protocols, such as, for example, remote desktop protocol (RDP) available from Microsoft® Corporation of Redmond, Wash. or alternatively, SPICE™ (simple protocol for independent computing environments) protocol available from Red Hat, Inc.

Referring back to FIG. 1, applications 111A-111B are hosted by servers 103-104 respectively and remotely accessed by client 101. For example, applications 111A-111B may be a virtual desktop application hosted by a virtual desktop server (VDS) and remotely accessed by client 101, similar to the Solid ICE™ (independent computing environments) virtualization solution available from Red Hat.

For the illustration purpose, it is assumed that initially client 101 accesses application 111A hosted within server 103. Application 111A generates an output (e.g., an image to be displayed) in a form of graphics structures, which are transmitted to client 101 over network 102 and rendered by rendering agent 106 in a display 105 of client 101. For example, client system 101 may operate as a management server such as a virtualization server of a virtualization system available from Red Hat.

For example, a graphics structure can be a sphere, which may be described by specifying a sphere center, radius, color, and opacity, etc. In a graphics application such as a video game, more complex graphics structures are needed to draw a video game scene such as textures (e.g., essentially a picture drawn on a surface of a shape). The graphics structures are transmitted by remote display system 112A to client 101 over network 102, where the graphics structures are rendered by rendering agent 106 in display 105.

According to one embodiment, when client 101 accesses application 111A of server system 103, graphics structures 109 may be received from server system 103 and stored in a storage device 108 associated with client 101. In addition, for each graphics structure, a hash is generated by hash generator 107 of client 101 and is stored in storage device 108. A hash can be generated using a variety of hashing algorithms, such as, for example, SHA-1 or MD5 algorithms.

Subsequently, when client 101 accesses application 111B of server 104, client 101 may transmit all hashes 110 maintained locally to server 104. In response, when a graphics structure is generated by application 111B, a new hash is also generated from the graphics structure by hash generator 113B. The new hash is compared by server 104 with those hashes that are received from client 101. If there is a match, the new hash is transmitted to client 101 for rendering without having to transmit the entire graphics structure. In this example, the hashes sent from client 101 to server 104 may be cryptographically strong hashes to prevent any specific information related to server 103 from being leaked to server 104. Storage devices 108 and 114A-114B may consist of one or more types of removable storage and/or non-removable storage. Note that some or all of the components as shown in FIG. 1 can be implemented in software, firmware, hardware, or a combination thereof.

The above described techniques may be applied to a situation in which a system such as a management system accesses multiple remote systems that host a graphics application where graphics structures used in display outputs of the graphics applications hosted by multiple systems are similar or identical. For example, when a management system accesses a first remote system, it obtains and renders all necessary graphics structures from the first remote system. Thereafter, the management system may log off or disconnect from the first remote system and log on or connect to a second remote system. Instead of obtaining all the necessary graphics structures representing a display output of an application hosted by the second remote system, one or more hashes may be received from the second remote system.

Figure 2:
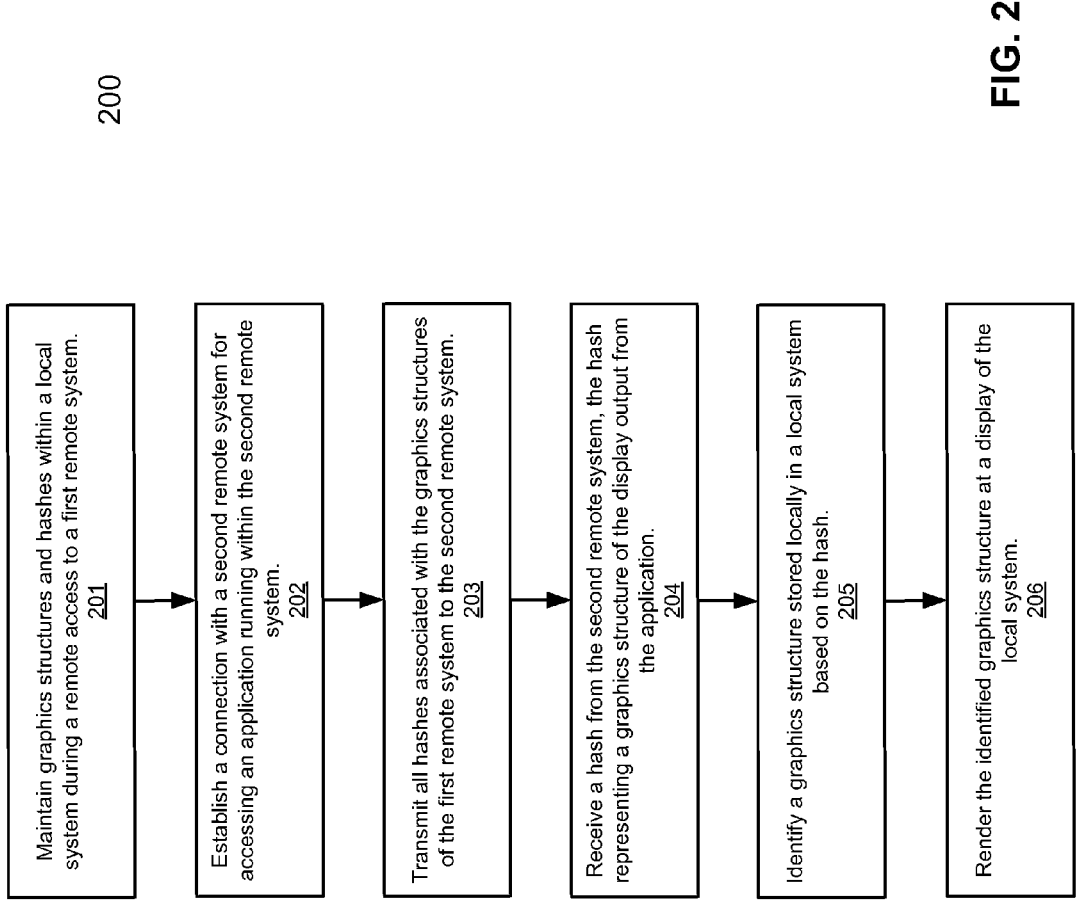
FIG. 2 is a flow diagram illustrating a method for persisting graphics structures in a graphics remoting environment according to one embodiment of the invention.

FIG. 2 is a flow diagram illustrating a method for persisting graphics structures in a graphics remoting environment according to another embodiment of the invention. For example, method 200 may be performed by client system 101 of FIG. 1. Referring to FIG. 2, at block 201, graphics structures and their corresponding hashes are maintained within a local system while accessing an application of a first remote system. At block 202, a connection is established between the local system and a second remote system for accessing an application hosted by the second remote system. At block 203, most or all hashes maintained locally are transmitted to the second remote system. At block 204, a hash is received from the second remote system, where the hash represents a graphics structure of a display output of the application hosted in the second remote system. At block 205, based on the hash received from the second remote system, a graphics structure is identified, for example, by matching the hash with those maintained locally. Thereafter at block 206, the identified graphics structure is rendered at a display of the local system.

Figure 3:
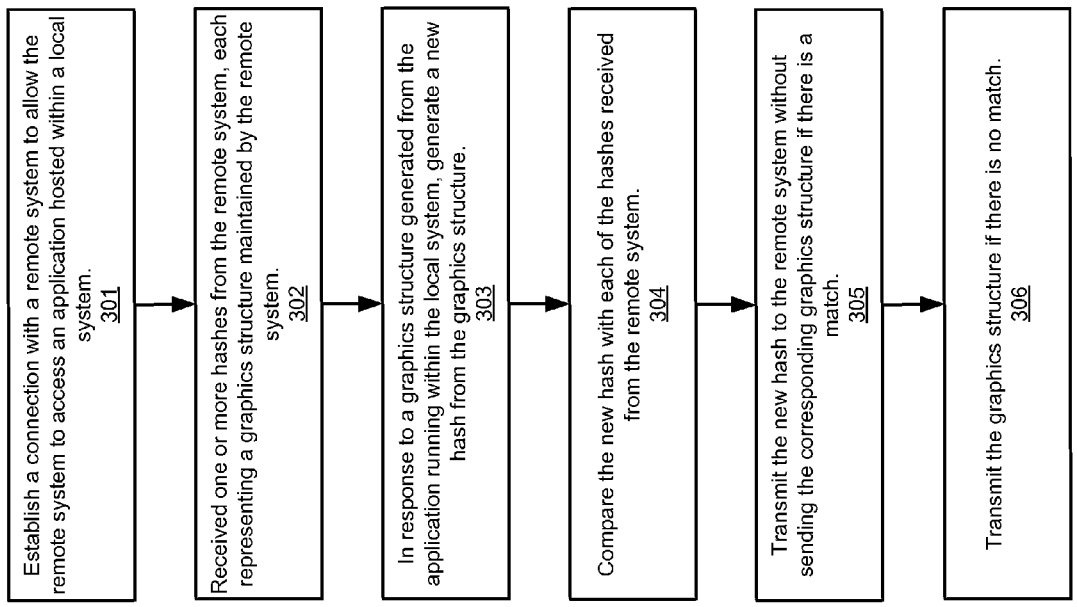
FIG. 3 is a flow diagram illustrating a method for persisting graphics structures in a graphics remoting environment according to another embodiment of the invention.

FIG. 3 is a flow diagram illustrating a method for persisting graphics structures in a graphics remoting environment according to another embodiment of the invention. For example, method 300 may be performed by server system 103/104 of FIG. 1. Referring to FIG. 3, at block 301, a connection is established in response to a request from a remote system for accessing an application hosted at a local system. At block 302, one or more hashes are received from the remote system. Each hash represents a graphics structure maintained and previously rendered by the remote system. In response to a graphics structure generated by the application hosted locally, which represents a display output of the application, a new hash is generated from the graphics structure. At block 304, the new hash is compared with the hashes received from the remote system to determine whether there is a hash that matches the new hash. At block 305, the new hash is transmitted to the remote system without sending the graphics structure if there is a match; otherwise at block 306, the entire graphics structure is sent to the remote system for rendering.

Figure 4:
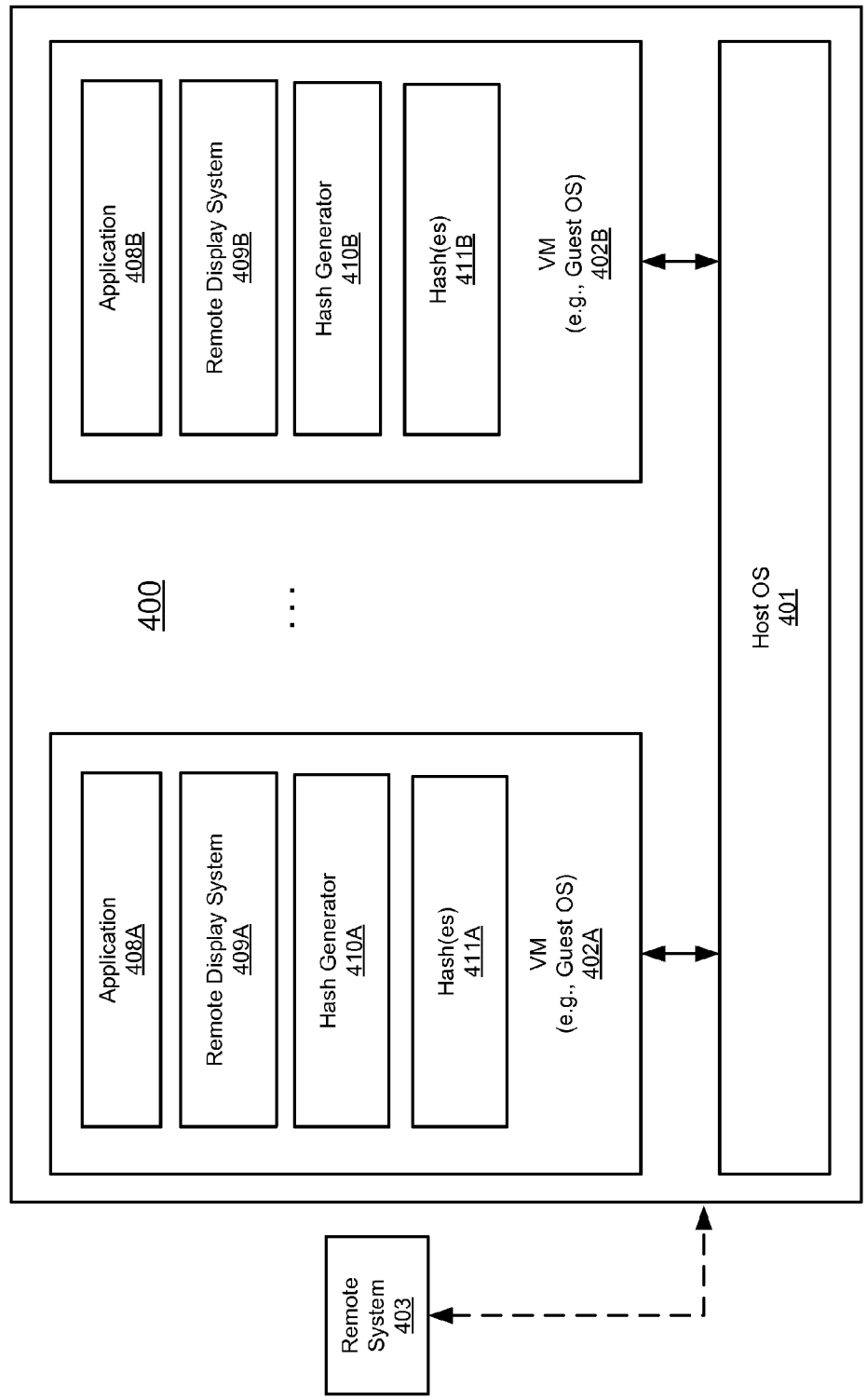
FIG. 4 is a block diagram illustrating an example of a virtualized environment which may be used with one embodiment of the invention.

According to some embodiments, the techniques described above can be applied to a virtualized operating environment. FIG. 4 is a block diagram illustrating an example of a virtualized environment which may be used with one embodiment of the invention. For example, system 400 may be implemented as part of server 103 or 104 of FIG. 1. Referring to FIG. 4, system 400 includes one or more virtual machines 402A-402B, which can be implemented in a form of a guest OS, hosted by a host OS 401. Each of VMs 402A-402B can host an application (e.g., applications 408A-408B). Multiple guest OSes (e.g., guest OSes 402A-402B) and the associated virtual machines may be controlled by host OS 401.

Typically, a host OS represents a virtual machine monitor (VMM) (also referred to as a hypervisor) for managing the hosted virtual machines. A guest OS may be of the same or different types with respect to the host OS. For example, a guest OS may be a Windows™ operating system from Microsoft Corporation of Redmond, Wash. and a host OS may be a LINUX operating system available from Red Hat, Inc. of Raleigh, N.C. In addition, the guest OSes running on a host can be of the same or different types. A virtual machine can be any type of virtual machines, such as, for example, hardware emulation, full virtualization, para-virtualization, and operating system-level virtualization virtual machines.

Different virtual machines hosted by a server may have the same or different privilege levels for accessing different resources.

Referring back to FIG. 4, each VM can include a remote display driver or system (e.g., remote display systems 409A-409B) to generate graphics structures of a display output of the corresponding application, a hash generator (e.g., hash generators 410A-410B) to generate a hash (e.g., hashes 411A-411B) for each graphics structure generated by the respective display driver client and to optionally maintain the hashes in a local storage of the guest OS.

According to one embodiment, for illustration purpose, when a request to establish a connection with a guest OS such as guest OS 402A from a client such as remote system 403 for accessing application 408A, hashes are received from client 403 representing all the graphics structures maintained by client 403. In this example, client 403 may have previously accessed another host system and obtained those graphics structures. In response, remote display system 409A may compare a hash corresponding to a graphics structure currently rendered by application 408A with those hashes received from client 403. If there is a match, the matched hash is transmitted to client 403 to enable client 403 to identify a graphics structures based on the hash from those graphics structures maintained by client 403 and to render the identified graphics structure accordingly. If there is no match, the entire graphics structure has to be sent to client 403. Note that some or all of the components as shown in FIG. 4 may be implemented in software, hardware, or a combination thereof.

Figure 5:
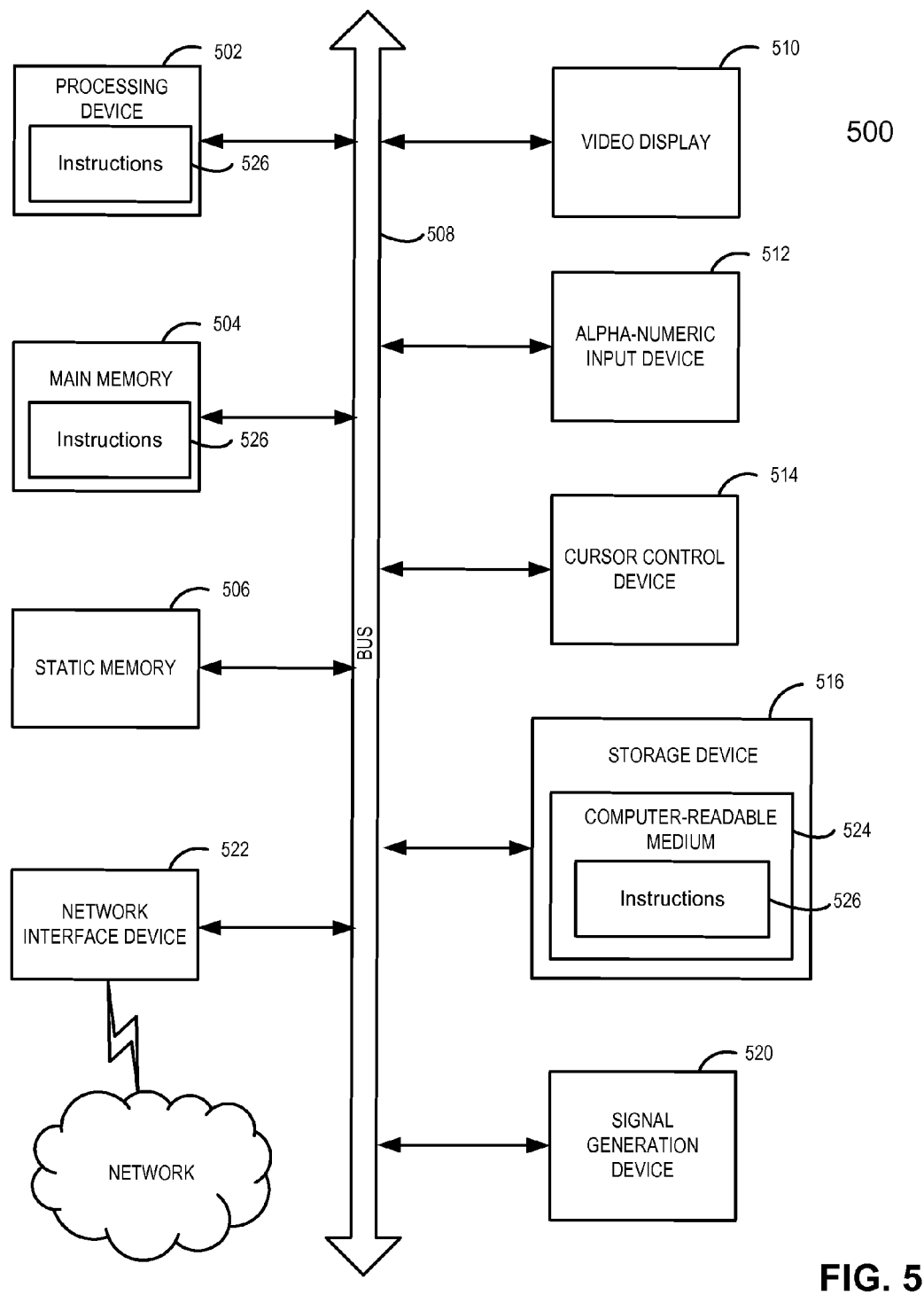
FIG. 5 is a block diagram illustrating a data processing system which may be used with an embodiment of the invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 508.

Processor 502 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 502 may also be one or more special-purpose processors such as an application specific integrated circuit (ASIC), a field programmable gate array (FPGA), a digital signal processor (DSP), network processor, or the like. The processor 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-accessible storage medium 524 (also known as a machine-readable storage medium or a computer-readable medium) on which is stored one or more sets of instructions or software 526 embodying any one or more of the methodologies or functions described herein. The instructions or software 526 may also reside, completely or at least partially, within the main memory 504 and/or within the processor 502 during execution thereof by the computer system 500, the main memory 504 and the processor 502 also constituting machine-accessible storage media. The instructions or software 526 may further be transmitted or received over a network via the network interface device 522.

The computer-readable storage medium 524 may also be used to store instructions or software 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 528, components and other features described herein can be implemented as discrete hardware components or integrated in the functionality of hardware components such as ASICS, FPGAs, DSPs or similar devices. In addition, the modules 528 can be implemented as firmware or functional circuitry within hardware devices. Further, the modules 528 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
    receiving, at a server, one or more hashes from a client, each of the hashes representing a graphics structure stored by the client;
    computing, at the server, a first hash based on a graphics structure that is generated by an application hosted by the server; and
    transmitting, from the server, the first hash to the client without sending the graphics structure when there is a hash from the one or more hashes received from the client that matches the first hash.

2. The method of claim 1, further comprising:
    determining, by the server, whether there is an existing hash from the one or more hashes received from the client that matches the first hash; and
    transmitting the graphics structure to the client when none of the one or more hashes received from the client match the first hash.

3. The method of claim 1, wherein the one or more hashes are received from the client in response to a connection established between the server and the client for accessing the application.

4. The method of claim 3, wherein hashes and graphics structures stored by the client are received from another server previously accessed by the client.

5. The method of claim 1, wherein the graphics structure is generated by the application in response to a change of resolution of a display.

6. The method of claim 1, wherein the server is hosted by a guest operating system (OS) as a part of a virtual machine (VM), and wherein the client is hosted by a host OS that hosts the VM.

7. A non-transitory computer readable medium including instructions that, when executed by a processing system, cause the processing system to perform a method comprising:
    receiving, at the processing system, one or more hashes from a client, each of the hashes representing a graphics structure stored by the client;
    computing, at the processing system, a first hash based on a graphics structure that is generated by an application hosted by the processing system;
    and
    transmitting, from the processing system, the first hash to the client without sending the graphics structure if there is an existing hash matching the first hash.

8. The non-transitory computer readable medium of claim 7,
    wherein the method further comprises:
    determining, by the processing system, whether there is an existing hash from the one or more hashes received from the client that matches the first hash; and
    transmitting the graphics structure to the client when none of the one or more hashes received from the client match the first hash.

9. The non-transitory computer readable medium of claim 7, wherein the one or more hashes are received from the client in response to a connection established between the server and the client for accessing the application.

10. The non-transitory computer readable medium of claim 9, wherein hashes and graphics structures stored by the client are received from another processing system previously accessed by the client.

11. The non-transitory computer readable medium of claim 7, wherein the graphics structure is generated by the application in response to a change of resolution of a display.

12. The non-transitory computer readable medium of claim 7, wherein the server is hosted by a guest operating system (OS) as a part of a virtual machine (VM), and wherein the client is hosted by a host OS that hosts the VM.

13. A system, comprising:
    a processor; and
    a memory coupled to the processor for storing instructions, which when executed by the processor, cause the processor to:
    receive one or more hashes from a client, each of the hashes representing a graphics structure stored by the client,
    compute a first hash based on a graphics structure that is generated by an application hosted by the system, and
transmit the first hash to the client without sending the graphics structure if there is an existing hash matching the first hash.

14. The system of claim 13, wherein the processor is also to:
   determine whether there is an existing hash from the one or more hashes received from the client that matches the first hash, and
   transmit the graphics structure to the client when none of the one or more hashes received from the client match the first hash.

15. A machine-implemented method comprising:
   transmitting, by a client, one or more hashes to a server, each of the hashes representing a graphics structure stored by the client;
   receiving from the server, by a rendering agent of the client, a hash representing a graphics structure that is generated by an application hosted by the server and accessed by the client;
   identifying by the rendering agent, based on the hash received from the server, a graphics structure from one or more graphics structures stored by the client; and
   rendering, by the rendering agent, the identified graphics structure to a display of the client.

16. The method of claim 15, further comprising:
   computing, by the client, a hash based on a graphics structure; and
   storing the computed hash in a storage device of the client.

17. The method of claim 15, wherein identifying the graphics structure based on the hash received from the server comprises:
   comparing the hash received from the server with hashes associated with the one or more graphics structures stored by the client.

18. The method of claim 15, wherein the one or more graphics structures stored by the client are received by the client during a previous remote access to another server.

19. The method of claim 15, wherein the client is hosted by a host operating system (OS), and wherein the server is hosted by a guest OS as a part of a virtual machine (VM) hosted by the host OS.

20. A non-transitory computer readable medium including instructions that, when executed by a processing system, cause the processing system to perform a method comprising:
   transmitting, by the processing system, one or more hashes to a server, each of the hashes representing a graphics structure stored by the client;
   receiving, by a rendering agent of the processing system, a hash representing a graphics structure that is generated by an application hosted by the server and accessed by the processing system;
   identifying by the rendering agent, based on the hash received from the server, a graphics structure from one or more graphics structures stored by the processing system; and
   rendering, by the rendering agent, the identified graphics structure to a display of the processing system.

21. The non-transitory computer readable medium of claim 20, wherein the method further comprises:
   computing, by the processing system, a hash based on a graphics structure; and
   storing the computed hash in a storage device of the processing system.

* * * * *